United States Patent [19]

Cheris et al.

[11] Patent Number: 5,749,464
[45] Date of Patent: May 12, 1998

[54] COMPACT DISC BINDER AND DISC CARRIER USED IN SAME

[75] Inventors: Albert B. Cheris, Highland Park, Ill.; Robert B. Staubitz, Collinsville; Timothy Repp, New Hartford, both of Conn.

[73] Assignee: Tenex Corporation, Elk Grove Village, Ill.

[21] Appl. No.: 813,232

[22] Filed: Nov. 1, 1996

[51] Int. Cl.[6] ................................................. B65D 85/57
[52] U.S. Cl. ................. 206/308.1; 206/311; 206/387.13
[58] Field of Search ............................. 206/307, 307.1, 206/308.1, 308.3, 309–313, 425, 387.13; 281/21.1, 29, 36, 37, 40; 402/70, 73

[56] References Cited

U.S. PATENT DOCUMENTS

| | | |
|---|---|---|
| 958,170 | 5/1910 | Proudfit . |
| 1,121,446 | 12/1914 | Alter . |
| 2,850,294 | 9/1958 | Ortis et al. . |
| 4,538,730 | 9/1985 | Wu . |
| 4,724,957 | 2/1988 | Burgschweiger . |
| 4,778,047 | 10/1988 | Lay . |
| 4,823,950 | 4/1989 | Roze . |
| 4,844,260 | 7/1989 | Jaw .................................. 206/308.3 |
| 4,875,743 | 10/1989 | Gelardi et al. . |
| 5,000,316 | 3/1991 | Lerner . |
| 5,011,010 | 4/1991 | Francis et al. . |
| 5,176,250 | 1/1993 | Cheng . |
| 5,180,058 | 1/1993 | Hu . |
| 5,322,162 | 6/1994 | Melk . |
| 5,334,904 | 8/1994 | Kramer . |
| 5,366,073 | 11/1994 | Turrentine et al. . |
| 5,370,224 | 12/1994 | Karakane et al. ........................ 206/309 |
| 5,375,937 | 12/1994 | Oh . |
| 5,396,987 | 3/1995 | Temple et al. ............................ 206/309 |
| 5,495,939 | 3/1996 | Castritis . |
| 5,499,847 | 3/1996 | Smith . |
| 5,505,299 | 4/1996 | Ditzig et al. . |
| 5,513,749 | 5/1996 | Simmons . |
| 5,575,388 | 11/1996 | Bolognia et al. ......................... 206/310 |
| 5,651,458 | 7/1997 | Brosmith et al. ...................... 206/308.1 |

*Primary Examiner*—Paul T. Sewell
*Assistant Examiner*—Luan K. Bui
*Attorney, Agent, or Firm*—Lockwood, Alex, Fitzgibbon & Cummings

[57] ABSTRACT

A binder housing multiple compact discs includes a hollow housing formed from two opposing housing portions interconnected at a common hinge line. The binder has an internal spine which spans the common hinge line and flexes between an untensioned position when the binder is closed to a tensioned position when the binder is opened. The internal spine includes a series of disc carriers which detachably engage the spine and when tensioned, the spine displays the disc carriers in a radial fashion.

23 Claims, 8 Drawing Sheets

COMPACT DISC BINDER AND DISC CARRIER USED IN SAME

BACKGROUND OF THE INVENTION

The present invention relates generally to compact disc storage cases, and more particularly to binders for holding and transporting a plurality of compact discs.

Audio compact discs have become extremely popular with consumers in the past few years and their popularity has led to the virtual elimination of records in the recorded music industry. Optically-readable compact discs are now being used in the computer software industry as the preferred medium for computer programs and data. Both audio and optically-readable compact discs (the latter being known in the art as CD-ROMS) are often sold to consumers in the form of hinged plastic boxes known in the trade as "jewel" boxes, that hold the disc and printed information about the disc. These jewel boxes are somewhat cumbersome and easily prone to breakage.

Many CD-ROMS supplied by computer software providers are not contained in any protective device such as a jewel boxes, but rather are contained in flexible plastic sleeves similar to a plastic bag. Although jewel boxes are suitable for storage and transport of one or two compact discs, as a user's collection of audio compact discs or CD-ROMS grows, the need arises for a compact disc binder in which the user can store and transport compact discs in a secure manner that prevents scratching or other damage from occurring to the disc.

Multiple compact disc storage and transport binders are known in the art and include complex structures or fragile holders which do not provide adequate support for the discs. Some of these known structures include flexible, plastic accordion-style folders that contain a plurality of discrete pockets each of which accommodates a compact disc therein. One such structure is sold under the tradename of "Five Feet of Software". This elongated sleeve with its individual pockets is fragile and prone to ripping apart when subjected to rough handling and repeated use.

Another compact disc binder incorporates flexible plastic pockets that are punched and are received in a ring binder similar to a looseleaf notebook. The plastic used in these pocket sheets may become torn at the holes which accommodate the rings of the binder.

Still another style of compact disc binder is described in U.S. Pat. No. 4,778,047, issued Oct. 18, 1988. This binder has two hinged shell members which enclose a plurality of individual compact disc envelopes that are detachably mounted to a series of mechanical leaf springs. The leaf springs provide pairs of metal spring arms to support each disc envelope. These spring arms are set into the shell in a manner so that they are biased outwardly into a display position and are compressed when the binder is closed. Inasmuch as the binder is closed for the majority of the time it is used, the spring arms may be subject to a constant stress when closed that stress may lead to weakening and breakage of the arms. Additionally, this complex construction requires the joining of the metal leaf springs to the plastic binder by way of a rivet, punch or the like. This connection will be prone to breakage.

The present invention is directed to a multiple compact disc storage/transport binder that overcomes the disadvantages of the prior art binders discussed above and offers certain advantages heretofore unknown in compact disc binders.

SUMMARY OF THE INVENTION

Accordingly, it is an object of the present invention to provide a compact disc storage/transport binder which encloses and detachably supports a plurality of disk carriers therein.

Another object of the present invention is to provide a transport binder for housing a plurality of compact discs in which the binder is formed from two opposing housing members which cooperatively define an internal storage space within the binder for a plurality of compact discs, the two housing members being joined together along a common line of the housing by a hinge, the binder including a flexible backbone portion which spans the common line and is joined to the opposing housing members so that when the binder is opened, and the two opposing housing members spread apart, the backbone is tensioned into a display position where it displays, in radial fashion, a plurality of disc carriers mounted thereto.

A further object of the present invention is to provide a compact disc transport binder having a hollow housing formed from two interconnected housing portions, the housing portions being joined together along a hinge line by a hinge, the housing having a plurality of disc carriers detachably supported within the binder housing on a spine member, the spine member spanning the hinge line and engaging the housing portions at opposite ends, the spine having a plurality of disc carrier positioners disposed thereon that detachably engage the disc carriers so that individual disc carriers may be selectively removed from the binder.

Still another object of the present invention is to provide a detachable disc carrier for use with a transport binder, the disc carrier having a disc-supporting surface formed thereon and a disc cover portion partially overlying the disc-supporting surface, the disc-supporting surface and cover portion forming a pocket that receives a compact disc therein.

Yet another object of the present invention is to provide a disc carrier for a compact disc binder in which the disc carrier has a disc-supporting base that supports a compact disc on opposite sides thereof and two disc cover portions overlying the base, the base further including a disc engagement means for holding two compact discs on opposite sides of the disc-supporting base.

In one principal aspect, the present invention accomplishes the aforementioned objects by providing a hinged binder housing defining two hollow housing halves interconnected along a common hinge line. A spine in the form of a flexible insert is held within the housing and attached at opposing ends to the two housing halves such that it spans the hinge line. In this manner, the spine is deformable between tensioned and untensioned positions when the binder housing is respectively closed and opened.

The spine is formed from a flexible material and has a plurality of disc carrier positioners formed thereon which extend out from a central surface thereof. When the binder is opened, the spine, particularly, the central surface thereof, is tensioned across the hinge line in a manner so that the disc carrier positioners are displayed in a radial fashion and they fan out from a virtual center of the spine insert. This radial display provides a comfortable spacing between adjacent compact disc carriers.

In another principal aspect of the present invention, the compact disc carriers are detachable from the spine insert. Each disc carrier includes at least one disc-receiving pocket and preferably two such disc-receiving pockets formed by cooperating disc covers overlying disc supporting surfaces of a central base portion of the disc carrier. These pockets may be located on opposite sides of the disc carriers so that each disc carrier has the ability to carry two discs.

These and other objects, features and advantages of the present invention will be clearly understood through a consideration of the following detailed description.

BRIEF DESCRIPTION OF THE DRAWINGS

In the course of the following description of the detailed description, reference will be made to the attached drawings wherein like reference numerals identify like parts and wherein.

DESCRIPTION OF THE PREFERRED EMBODIMENTS

Figure 1:
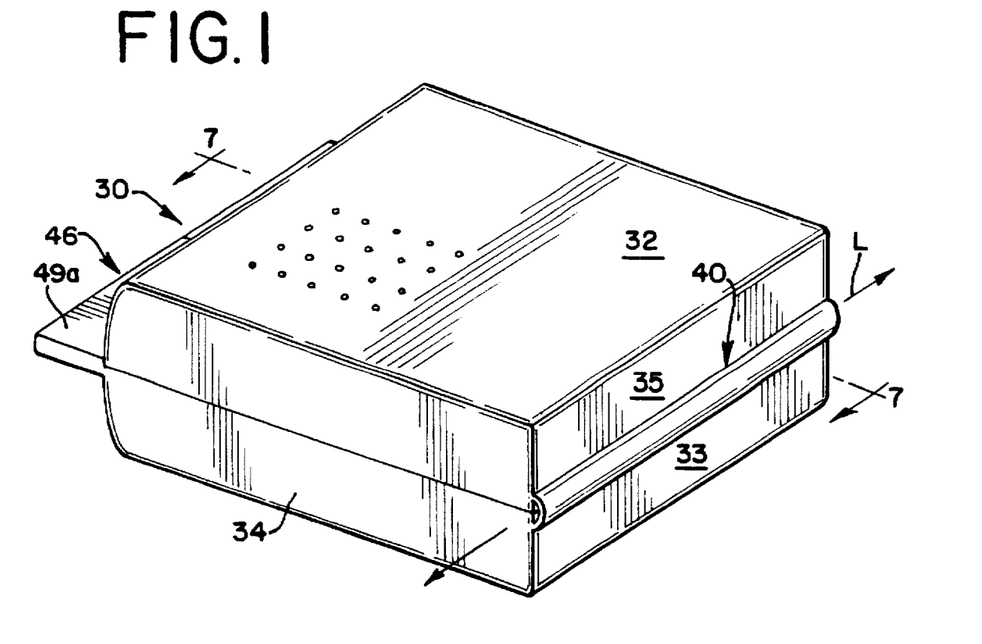
FIG. 1 is a perspective view of one embodiment of a compact disc binder constructed in accordance with the principles of the present invention and illustrating the binder in a closed position.
Figure 2:
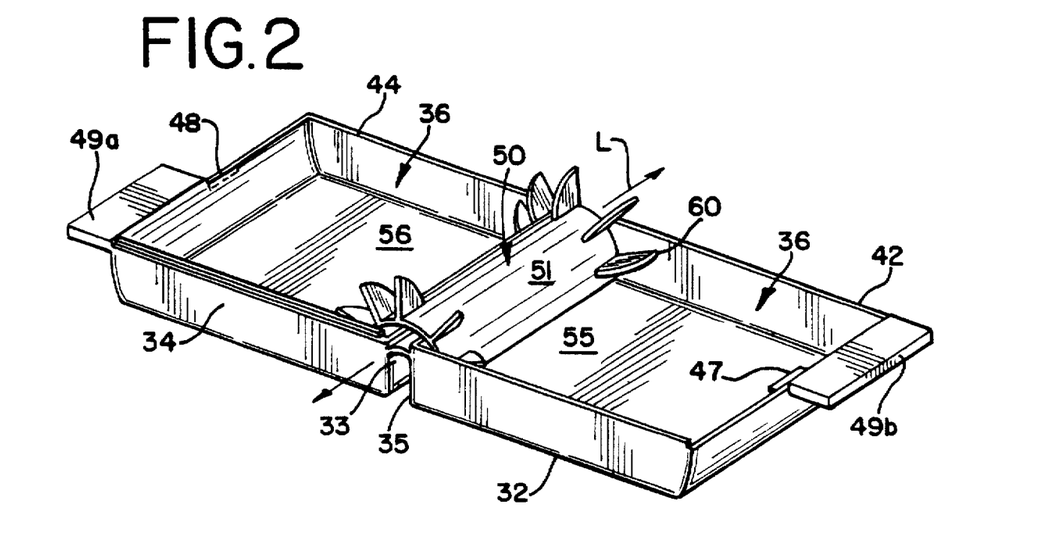
FIG. 2 is a perspective view of the disc binder of FIG. 1 illustrated in an open position with its internal spine under tension.

FIG. 1 illustrates one embodiment of a compact disc binder 30 constructed in accordance with the principles of the present invention. The binder 30 defines a housing 31 having an interior storage space 36 for housing multiple compact discs 80. The binder housing 30 comprises two housing half portions 32, 34 that are joined together along a common line or axis L near respective endwalls 33, 35 of the binder housing 30. As illustrated in the Figures, this joining is preferably accomplished by way of a hinge 40. The hinge 40 is illustrated as a living hinge which is integrally formed with the housing portions 32, 34. Other styles of hinge constructions may be used with the present invention, such as the hinge assembly 152 illustrated in FIG. 15.

The housing portions 32, 34 engage each other along complementary engaging inner peripheral edges 42, 44 formed thereon. These edges 42, 44 mate together when the binder housing 31 is in a closed position as illustrated in FIG. 1. The forward end 46 of the binder housing 31, i.e., that end opposite the hinge 40 may include a positive engagement means for holding the binder shut when in its closed position such as a detent 47 and a recess 48. In order to facilitate the opening of the binder 30 by a user, the housing portions 32, 34 may be provided with one or more tabs 49a, 49b extending outwardly therefrom which the user may grasp and apply an opening force to open the binder housing 31.

In an important aspect of the present invention, the binder 30 includes a resilient spine 50 that has a plurality of disc carrier positioners 60 disposed thereon which engage a plurality of disc carriers 70. The spine 50 is disposed within the binder housing 31 in a manner so that it spans the hinge line L of the binder housing 31 and extends between the two housing half portions 32 and 34. The spine 50, as explained in greater detail below, is attached to the binder housing 31 so that it overlies the common line L and flexes into a tensioned position where it adopts an arcuate, or bowed configuration, when the binder housing 31 is opened.

Figure 3:
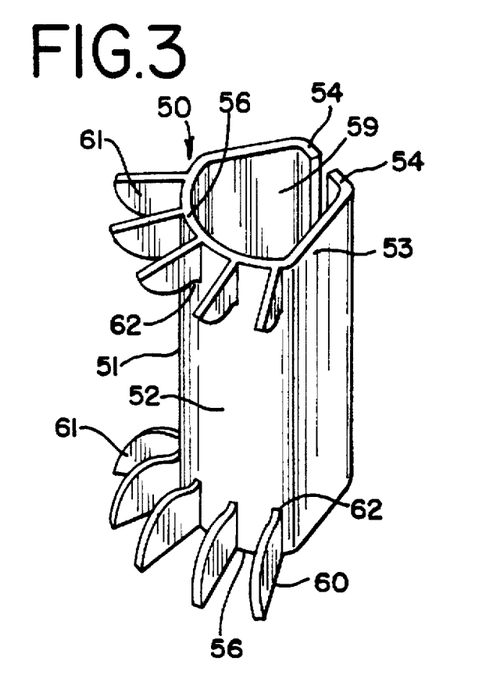
FIG. 3 is a perspective view of the spine of used in the compact disc binder of FIG. 2 removed from the disc binder and illustrated in a tensioned position.
Figure 4:
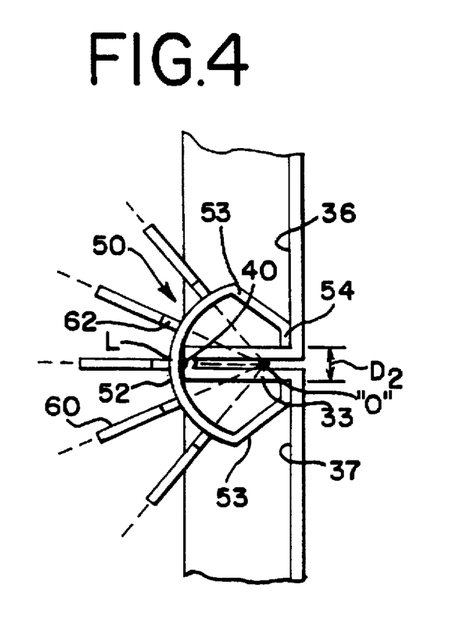
FIG. 4 is an enlarged detailed sectional view of the spine member of FIG. 3 in place within the disc binder of FIG. 2, illustrating the spine in a tensioned position when the disc binder is opened.

As seen in FIG. 3, the spine 50 preferably takes the form of an elongated, flexible insert 51 having a center portion 52 and two leg portions 53 extending therefrom. The leg portions 53, particularly their free ends 54, are attached to either the inner surfaces of the housing portion endwalls 33, 35 or the interior surfaces 36, 37 of the housing portions 32, 34 by any suitable means, such as solvent welding, ultrasonic welding or the like. Inasmuch as the spine 50 must flex when the binder housing 31 is opened and return to an unflexed position when the binder housing is closed, the spine insert 51 is formed from a resilient material such as plastic, and particularly a flexible polypropylene. The binder 30 is also preferably formed from a plastic and thus the joining of the spine insert 51 to the housing portions 32, 34 is easily accomplished by the aforementioned welding without the need for mechanical mounting hardware, such as screws, rivets or the like. The leg portions 53 may be scored near their ends 54 so that the leg portions 53 will bend at a particular location thereon as illustrated in FIG. 4.

Figure 5:
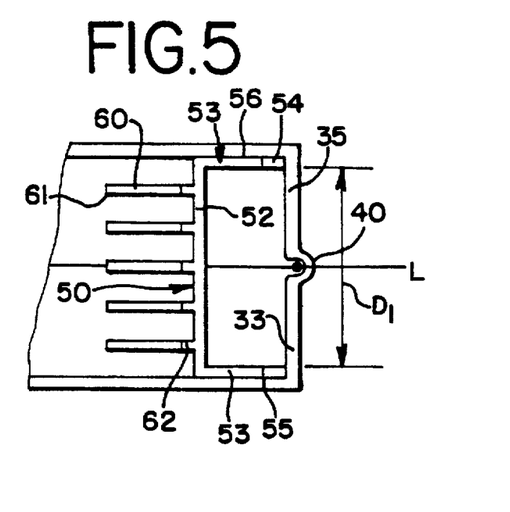
FIG. 5 is an enlarged detailed sectional view of the spine member of FIG. 3 in place within the disc binder of FIG. 2, illustrating the spine in an untensioned position when the disc binder is closed.

As mentioned above, it is preferred that the spine insert 51 be formed from a resilient material so as to allow it to deform into its flexed, or tensioned condition when the binder housing 31 is opened. The spine insert 51 also has a somewhat generally C-shaped configuration when viewed an end thereof such as illustrated in FIG. 5 and defining an internal cavity 59. This somewhat general C-shaped configuration remains, with the spine insert 51 when it is flexed, although in a much exaggerated C-shape, as illustrated in FIG. 4.

Figure 7:
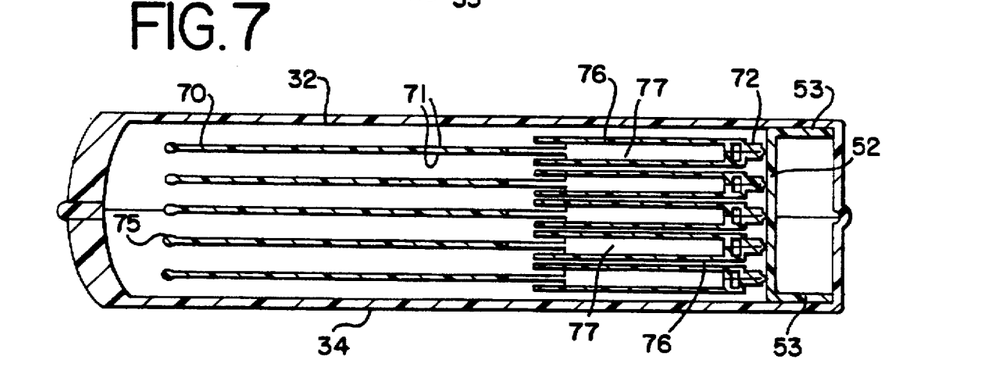
FIG. 7 is a sectional view of the disc binder of FIG. 1, taken along lines 7—7 thereof.

The operation of the spine 50 with respect to the binder housing 31 will now be explained. When the spine 50 is installed in the binder housing 31, the spine adopts a static position when the binder is closed. (FIG. 5.) In this position, the flexible insert 51, and particularly the center portion 52 thereof is untensioned and the center portion 52 extends somewhat generally transverse or perpendicular to the walls of the housing portions 32, 34. (FIG. 5.) The disc carrier positioners 60 in this position extend somewhat generally parallel to each other within the binder housing 31, and the disc carriers 70 are likewise displayed in the same fashion. (FIG. 7.)

Figure 6:
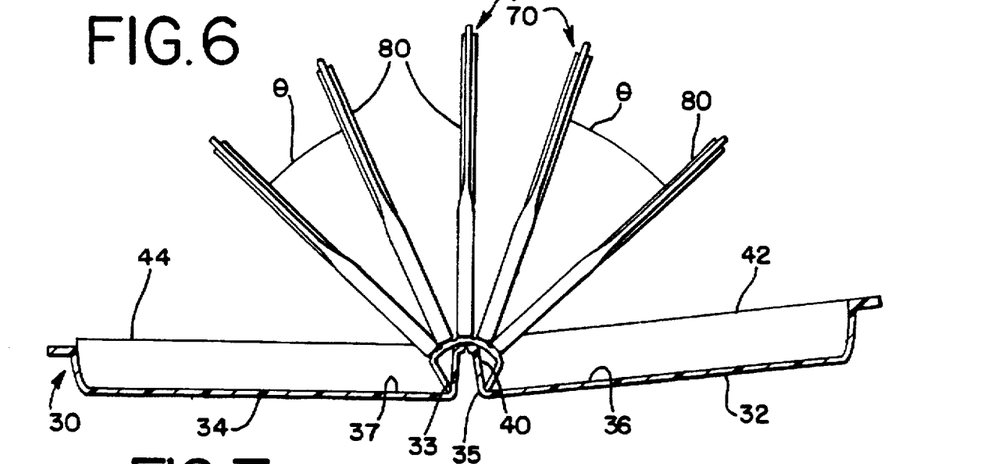
FIG. 6 is a sectional view of the binder of FIG. 1 in an opened position, illustrating the radial display by the spine of the disc carriers.

When the binder housing 31 is opened, the center portion 52 of the flexible insert 51 is placed under tension by virtue of a reduction of the distance between the ends 54 of the insert leg portions 53. The distance $D_1$ between the insert leg portion ends 54 is greatest when the binder housing 31 is closed (FIG. 5) and is shortest when the binder housing 31 is opened. When the binder housing 31 is opened, the reduction of this distance and the impingement of the center portion 52 (FIG. 4) onto the two housing endwalls 33, 35 which may occur places the center portion 52 of the spine 50 under tension. In this tensioned condition, the disc positioners 60 are now displayed in a radial, (rather than parallel) fashion and any disc carriers 70 attached thereto will fan out with an angular spacing θ therebetween for easy access by a user. (FIG. 6.) If imaginary lines are drawn along the positioners 60, they will intersect at a point "O" beneath the hinge line L.

The spine 50 serves as a mount for a series of compact disc carriers 70 (FIG. 8), each of which carries or one or more compact discs 80 thereon. The disc carriers 70 are detachable from their associated positioners 60 so that a user may "scroll through" the displayed disc carriers 70 and remove the disc carrier 70 from the binder housing 31. In order to provide the desired amount of detachability, the spine 50 is provided with means for engaging the disc carriers 70, illustrated in the Figures as pairs of disk positioners 60. The disk positioners 60 include quarter-circle segments 61 located near opposing ends 56 of the spine insert 51. Each disk positioner 60 may include a slot or recess 62 formed near its base which engages complementary-shaped rib imparts a positive snap-lock type engagement.

Figure 8:
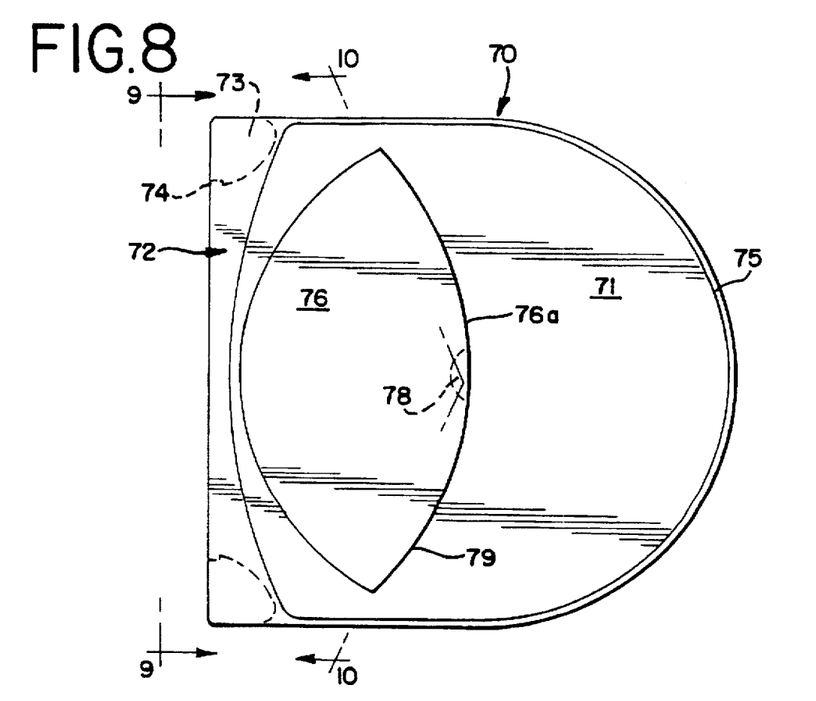
FIG. 8 is a plan view of a disc carrier used in conjunction with the compact disc binder of FIG. 1.
Figure 9:
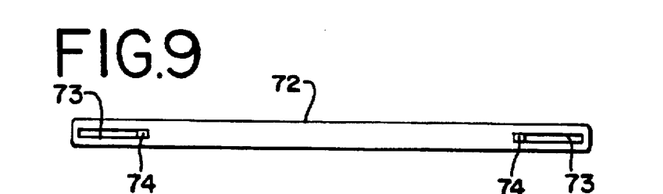
FIG. 9 is an end view of the disc carrier of FIG. 8 taken along lines 9—9 thereof.
Figure 10:
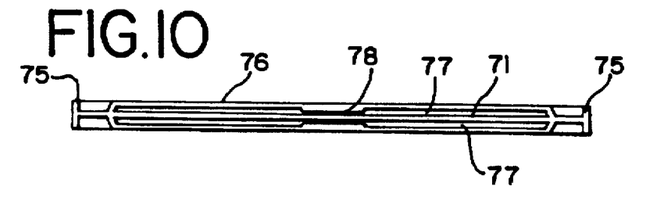
FIG. 10 is a sectional view of the disc carrier of FIG. 8 taken along lines 10—10 thereof.

Turning now to FIGS. 8–10, a disc carrier 70 is illustrated. The disc carrier 70 has a somewhat general D-shaped configuration when viewed in plan view (as shown in FIG. 8) and includes a flat disc-supporting surface 71 at its forward end that extends from a mounting base 72 at its near end. The mounting base 72 has a pair of openings 73 formed therein which receive the spine insert disc positioners 60. The openings 73 may include ribs 74 that engage the recesses 62 of the disc positioners 60. A raised rib 75 extends around substantially the entire perimeter of the disc-supporting surface 71 and provides a means for retaining the compact disc 80 in place upon the disc-supporting surface 71.

Another means for retaining the compact disc 80 in place on the disc carrier 70 is provided by way of a disc cover portion 76 which is spaced apart and raised from the disc-supporting surface 71 to in essence, define a pocket 77 that receives a portion of the compact disc 80 therein. The disc cover portion 76 may include a projection 78 on its inner surface as illustrated in FIG. 10 that engages the inner hole 81 of the compact disc 40. The disc cover portion 76 and disc-supporting surface 71 may be disposed on opposite sides of the disc carrier 70 so that each side is a mirror image of each other as seen in FIG. 10.

Figure 11:
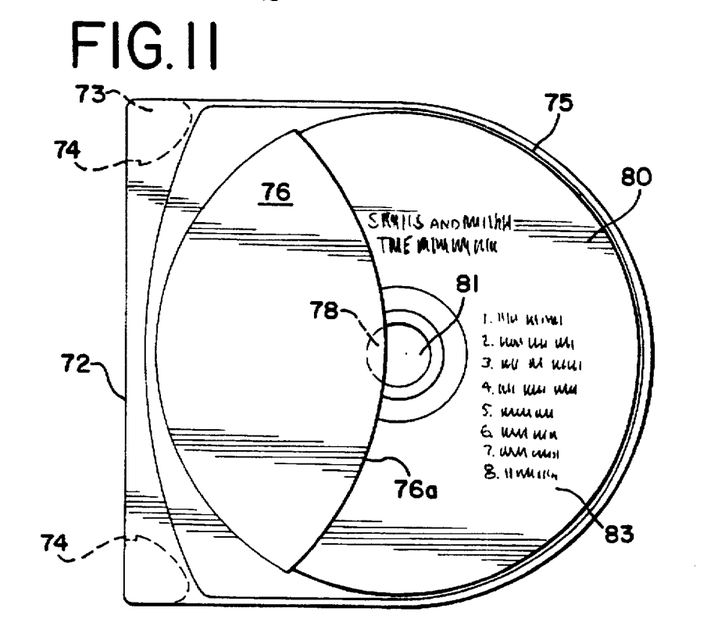
FIG. 11 is a plan view of disc carrier of FIG. 8 with a compact disc in place on its disc-supporting and partially received within its disc-receiving pocket.
Figure 12:
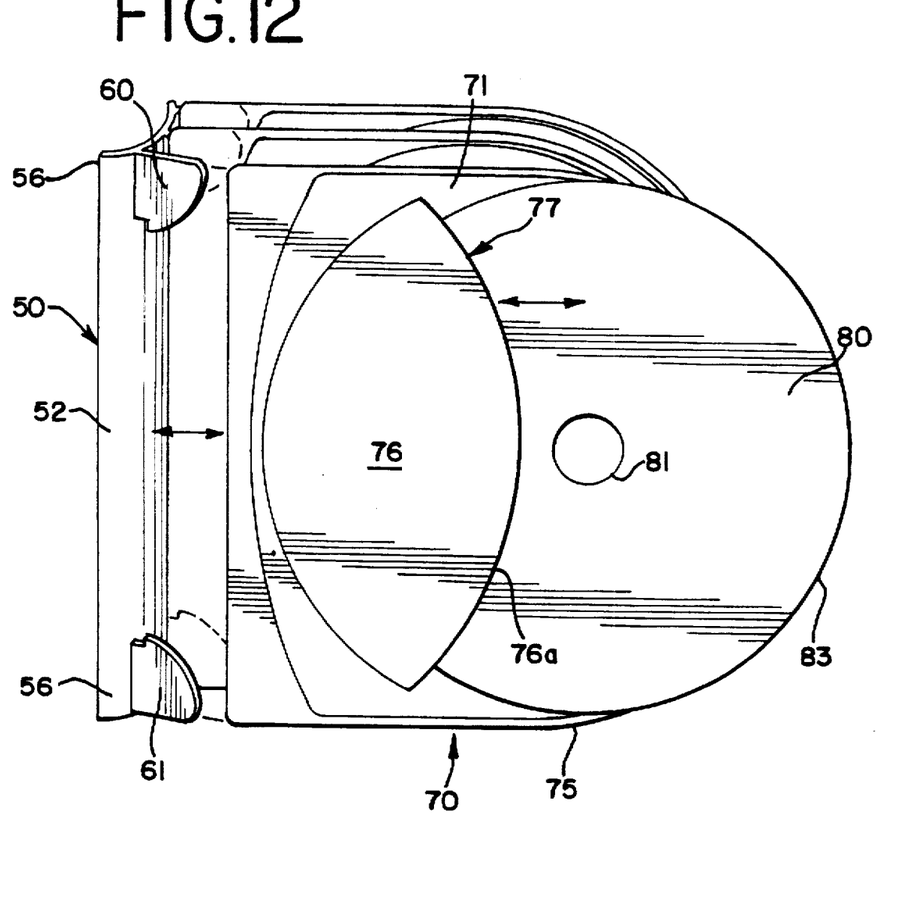
FIG. 12 is a perspective view of the spine insert member of FIG. 3 with a series of disc carriers in place thereon and one disc carrier removed therefrom.

The leading edge 76a of the disc cover portion 76 as well as the disc-receiving pocket 77 has an arcuate shape which intersects the inner hole 81 of a compact disc 80 when placed in the pocket 77. In this regard and as seen in FIG. 11, the cover portion 76 therefore covers a fractional amount of the display face 83 (that face which displays the title and other information on the disc of the compact disc 40) which is less than 50% of the total surface area of the display face 83 of the disc 80. In the preferred embodiment, the disc-supporting surface 71 has a trailing edge 79 which lies close to the leading edge 76a of the cover portion such that the disc-supporting surface 71 supports a fractional amount of the area of the readable face (that face which the laser impinges upon during reading or playing) of the compact disc, which fractional amount is greater than 50% of the total surface area of the readable face. Therefore, the disc carrier disc cover and disc-supporting surfaces 71 together contact (albeit on opposing sides of the disc 80) approximately 100% of the area of the compact disc 80.

Figure 13:
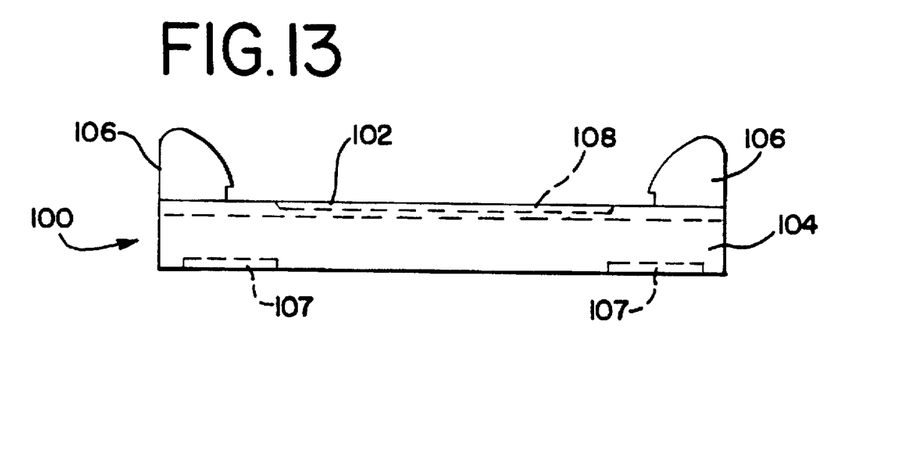
FIG. 13 is an end view of an alternate embodiment of a spine member suitable for use with the compact disc binder of the present invention.

FIG. 13 illustrates an alternate embodiment of a spine 100 which may be utilized in disc binders constructed in accordance with the present invention. This spine 100 has a somewhat general C-shaped configuration with a center portion 102 extending between two spaced-apart legs 104. A plurality of disc carrier positioners 106 are disposed on the spine center portion 102 in aligned pairs to support respective associated disc carriers 110. The spine 100 may include internal feet 107 that extend inwardly which are used to affix the spine 100 to the binder housing. An additional feature of this spine 100 not found in the spine of FIGS. 3–5, is the provision of slots 108 in the center portion 102 thereof. These elongated slots 108 receive projecting lugs 120 of the disc carriers 110 as explained below.

Figure 14:
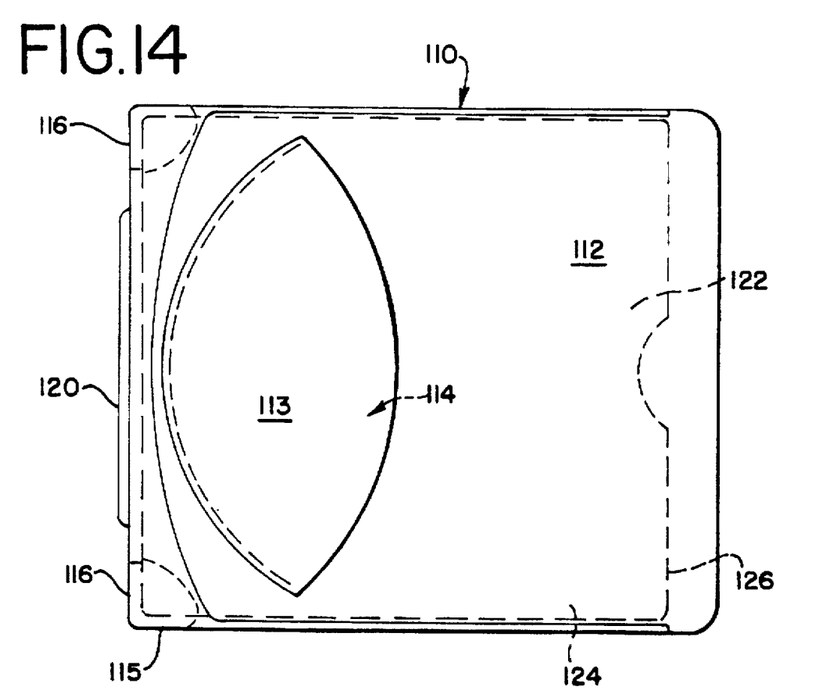
FIG. 14 is a plan view of an alternate embodiment of a disc carrier suitable for use with the compact disc binder of the present invention.

FIG. 14 illustrates a second embodiment of a disc carrier 110 used in disc binders of the present invention and particularly suitable for use in association with the spine 100 of FIG. 13. The disc carrier 110 includes a planar disc supporting surface 112 with a raised disc cover portion 113 disposed thereon that defines a disc-receiving pocket 114 therebetween. The base 115 of the disc carrier 110 has a pair of openings 116 adapted to receive the disc positioners 106 of the spine 100 and further includes an elongated lug 120 that is received within a slot 108 of the spine 100. On the obverse side of the disc carrier 110 shown in FIG. 14, an envelope 122 may be formed to hold printed information which accompanies the compact disc. This envelope 122 may include a plastic sheet 124 heat sealed at three of its edges along the dashed line 126 shown in FIG. 14.

Figure 15:
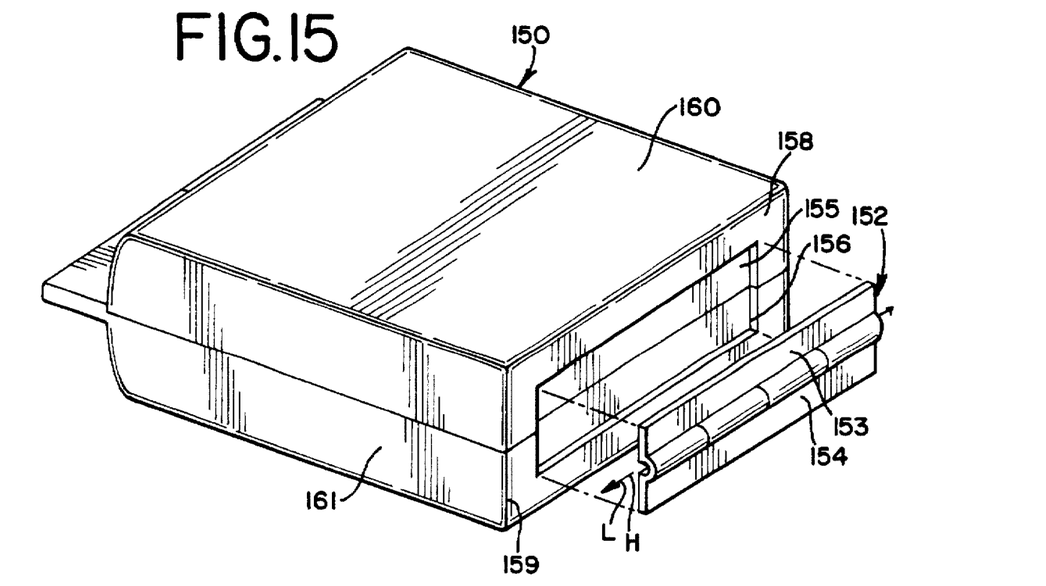
FIG. 15 is a perspective exploded view of an alternate hinge construction suitable used with the disc binder of the present invention.

FIG. 15 illustrates an alternate disc binder housing 150 utilizing a hinge assembly 152 rather than the integrally formed living hinge 40 shown in FIGS. 1, 4 & 5. The hinge assembly 152 comprises a pair of interengaged hinge plates 153, 154 which are hinged together along a common line L. The hinge plates 153, 154 are received within a pair of corresponding recesses 155, 156 formed in the endwalls 158, 159 of the two housing half portions 160, 161. The common line L is coincident with the axis of the hinge H and therefore lies between the two housing portions endwalls.

FIGS. 16–20 illustrate another embodiment of a disc carrier 200 suitable for use in disc binders of the present invention. The disc carrier 200 includes an end portion 202 that engages the spine disc positioners of the disc binders described in detail above. The disc carrier 200 includes a central, planar base portion 204 which defines two disc-supporting surfaces 206 for the carrier 200. A slightly raised rim 208 may be formed along the top, bottom and forward edges 209 of the carrier 200 to assist in retaining a compact disc on the carrier 200.

Figure 16:
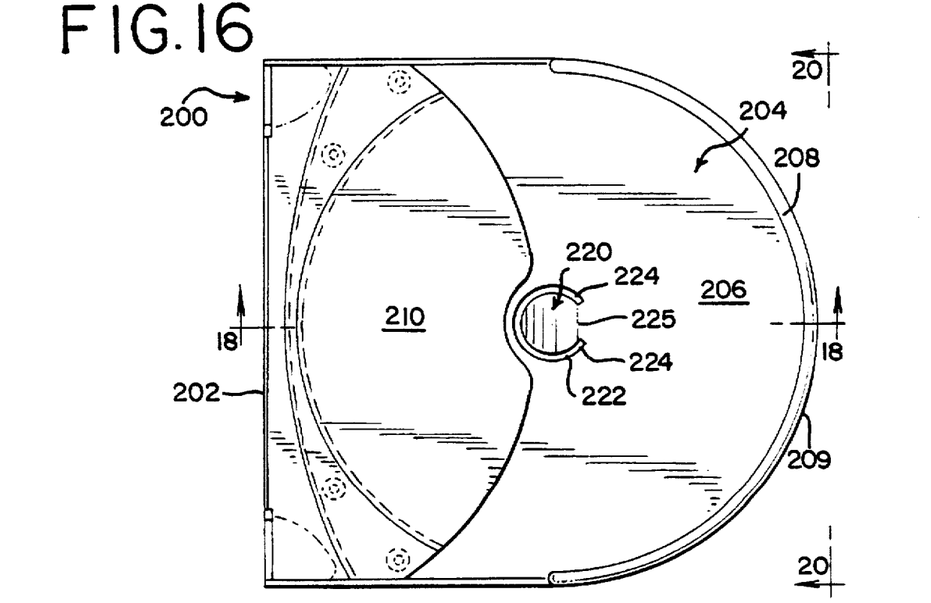
FIG. 16 is a plan view of another embodiment of a disc carrier suitable for use with the compact disc binder of the present invention.
Figure 17:
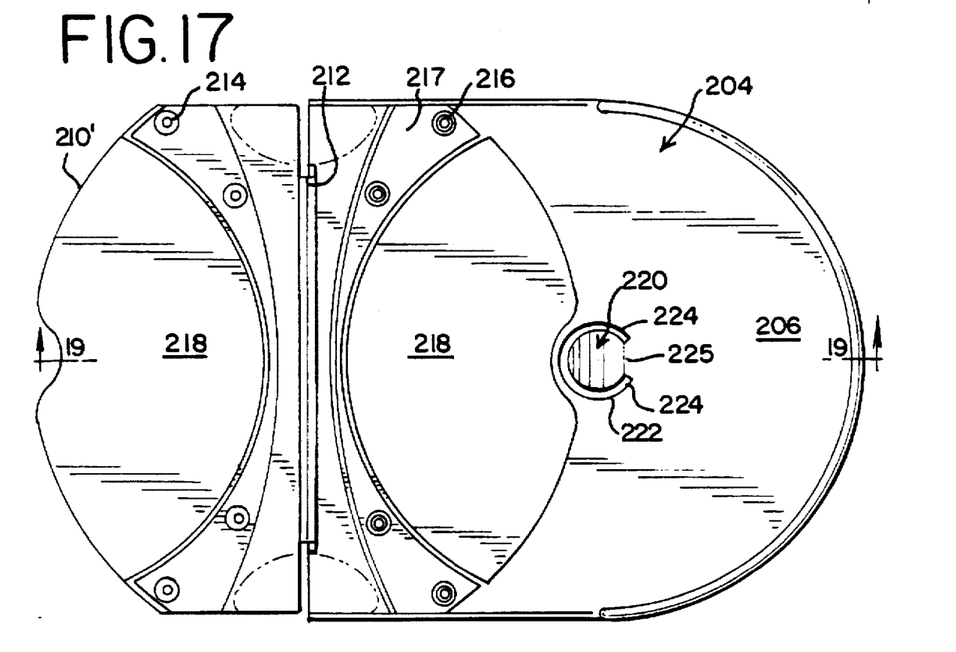
FIG. 17 is a plan view of the disc carrier of FIG. 16 showing the disc carrier with its two halves opened.
Figure 18:
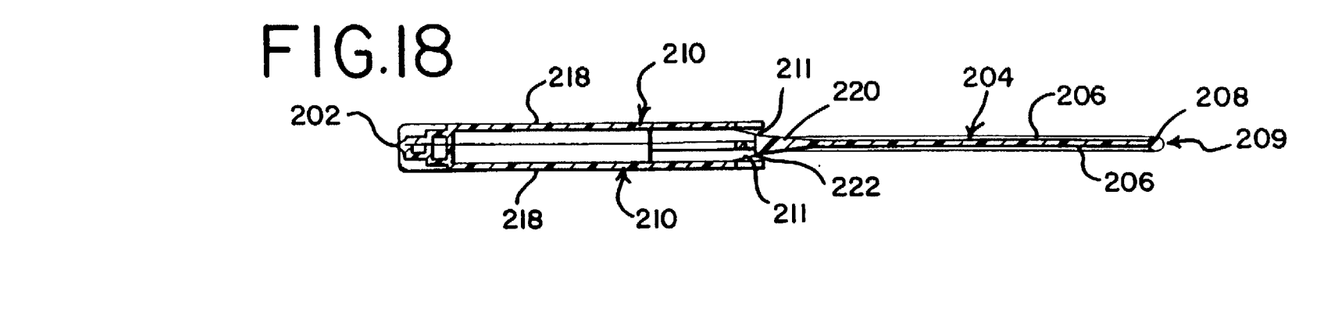
FIG. 18 is a sectional view of the disc carrier of FIG. 16 taken along lines 18—18 thereof.
Figure 19:
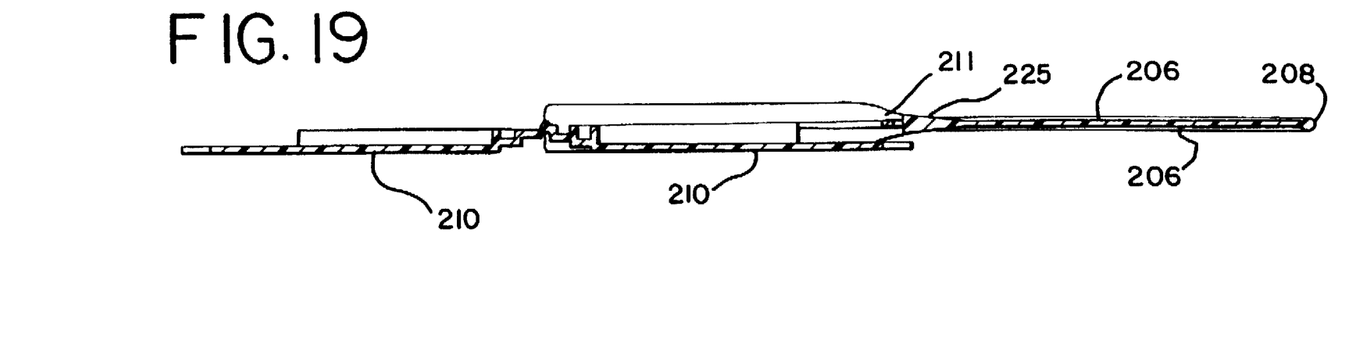
FIG. 19 is a end view of the disc carrier of FIG. 17 taken along lines 19—19 thereof; and, FIG. 20 is an frontal end view of the disc carrier of FIG. 16 taken along lines 20—20 thereof.
Figure 20:
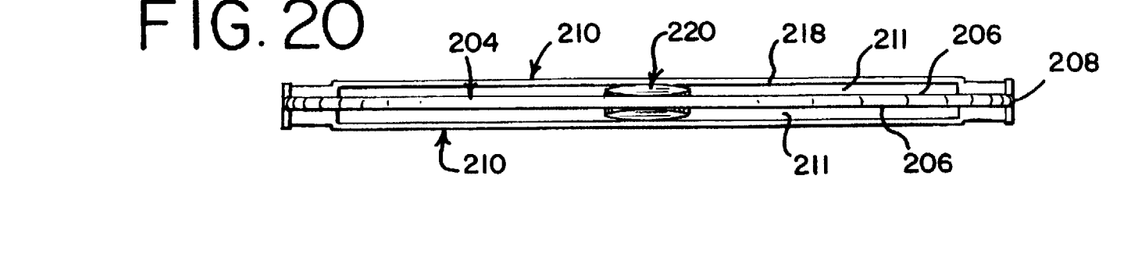

Two raised disc cover portions 210 are disposed on opposite sides of the central base portion 204. At least one of the cover portions 210', as illustrated in FIG. 17, is attached to the carrier 200 by way of a living hinge 212 and includes one or more recesses 214 that receive bosses 216 formed in an opposing surface 217 thereof. The disc cover portions 210 include circular segments 218, each such segment being illustrated in FIGS. 16 & 17 as having an area less than an entire circle and approximating at least one-third of the area of a circle coincident with the disc-supporting surface 206. The disc cover portions 210 are spaced apart from the respective disc-supporting surfaces 206 that they cover to define disc-receiving pockets, or passages 211. The disc cover portions 210 may be considered as raised with respect to the disc-supporting surfaces 206 when viewed from the front and side ends, as illustrated in FIGS. 18 & 20.

In order to assist in the retention of the compact discs on the disc supporting surfaces 206, the central base portion 204 may have a raised engagement member 220 rising up from the disc-supporting surface 206 in the shape of a circle that matches the diameter of the compact disc hole 81. This raised engagement member 220 may be formed integrally with the base portion 204 and partially separated therefrom by a partial ring opening 222 having two free ends 224. The area 225 between the two free ends 224 may be ramped upwardly from the disc-supporting surfaces 206. The partial separation of the engagement member 220 permits a user to easily disengage the compact disc from engagement with the engagement member 220 by pressing down it relative to its surrounding disc-supporting surface 206.

The disc carriers and the binder disclosed herein may be easily manufactured by injection molding and formed from durable plastics. The disc carriers are securely held in place within the binder and are displayed in an attractive radial, or "sunburst", fashion to permit a user to view almost all of the discs held on the carriers. The disc carriers are easily detachable from the disc binder and securely retain the compact discs in place thereon so that they may be removed with the discs in place.

It will be appreciated that the embodiments of the present invention discussed herein are merely illustrative of a few applications of the principles of the invention. Numerous modifications may be made by those skilled in the art without departing from the true spirit and scope of the invention.

We claim:

1. A binder for housing a plurality of compact discs, comprising: a binder housing having two opposing housing half portions joined together along a common line of the binder housing; a resilient spine disposed within said binder housing and extending between the binder housing half portions, the spine further spanning the binder housing common line, said spine further including a plurality of positioners disposed thereon; a plurality of disc carriers detachably engaging the positioners, said spine being deformable between an untensioned configuration when said binder housing is closed and a tensioned configuration when said binder housing is opened, whereby in the tensioned configuration, said disc carriers are displayed in a radial fashion.

2. The compact disc binder as defined in claim 1, wherein said two housing half portions are joined together by way of a hinge.

3. The compact disc binder as defined in claim 2, wherein said hinge is a living hinge extending between said housing half portions and said living hinge extends along said binder housing common line.

4. The compact disc binder as defined in claim 1 wherein said binder housing common line lies between two adjoining endwalls of said binder housing half portions and said two housing half portions are joined together by a hinge assembly, the hinge assembly including two hinge plates joined together by a hinge, the hinge plates being respectively affixed to binder housing half portion adjoining endwalls.

5. The compact disc binder as defined in claim 1, wherein said spine includes a flexible insert having a generally C-shaped configuration, the flexible insert having a center portion and two leg portions extending therefrom, the leg portions being spaced apart from each other and engaging said housing half portions on opposite sides of said binder housing common line such that said flexible insert center portion overlies said binder housing common line.

6. The compact disc binder as defined in claim 5, wherein said positioners are disposed on said flexible insert center portion in associated pairs.

7. The compact disc binder as defined in claim 6, wherein said positioners extend outwardly from said flexible insert center portion and said disc carriers include openings aligned with said positioners, said positioners being received within said disc carrier openings when said disc carriers are engaged with said spine.

8. The compact disc binder as defined in claim 1, wherein each of said disc carriers includes a planar disc-supporting surface and a disc cover portion spaced apart from said disc-supporting surface, said disc cover portion and disc-supporting surface cooperating to define a disc-receiving pocket on said disc carrier.

9. The compact disc binder as defined in claim 1, wherein each said disc carrier includes a peripheral rim extending about said disc-supporting surface.

10. The compact disc binder as defined in claim 1, wherein said binder housing is formed from a rigid plastic and said spine is formed from a resilient plastic.

11. The compact disc binder as defined in claim 1, wherein said positioners include arcuate-shaped tabs and said disc carriers include arcuate-shaped openings that receive said disc positioner tabs.

12. The compact disc binder as defined in claim 1, wherein said positioners are spaced apart from each other on said flexible insert center portion in a manner such that said positioners are generally parallel to each other when said binder housing is closed and said positioners are angularly spaced apart from each other when said binder housing is opened.

13. The compact disc binder of claim 1, wherein said disc positioners include tabs extending outwardly from said spine and said disc carriers include openings that receive said disc positioner tabs.

14. A storage case for multiple compact discs containing individual, removable compact disc carriers which are presented in a radial display fashion when the storage case is opened, said storage case comprising: opposing first and second cover portions hinged together along a hinge line thereof which extends along one end of said storage case and between adjoining endwalls of said cover portions, the first and second cover portions being openable and closeable about said hinge line and cooperatively defining a hollow enclosure for enclosing a plurality of compact discs,     an internal spine having a center mounting portion and first and second engagement portions, the spine first and second engagement portions respectively engaging said first and second cover portions such that said spine center mounting portion overlies and spans said hinge line, and,     a plurality of disc carriers detachably mounted to said spine center mounting portion, whereby, when said storage case is opened and said first and second cover portions are moved apart from each other around said hinge line, said disc carriers are displayed from said spine in an angular radial arrangement around said hinge line.

15. A storage case for multiple compact discs as claimed in claim 14, wherein said spine portion includes a flexible, generally C-shaped insert.

16. A storage case for multiple compact discs as claimed in claim 15, wherein said spine portion includes first and second spaced-apart free ends respectively attached to said first and second cover portions, whereby the distance between said first and second free ends is greater when said first and second cover portions are closed than when said first and second cover portions are opened.

17. A storage case for multiple compact discs as claimed in claim 14, wherein said spine has a plurality of disc carrier positioning members arranged in spaced-apart order on said spine center portion, the disc carrier positioning members being arranged in a generally parallel orientation when said storage case is closed and said disc carrier positioning members being arranged in a radial fashion when said storage case is opened.

18. A storage case for multiple compact discs as claimed in claim 17, wherein each of said disc carriers includes a base, the base having at least one recess disposed therein which receives a disc carrier positioning member therein.

19. A storage case for multiple compact discs as claimed in claim 14, wherein each of said disc carriers include a disc-supporting surface and a cover portion which cooperatively define a disc-receiving pocket on said disc carrier.

20. A storage case for multiple compact discs as claimed in claim 14, wherein said spine first and second engagement portions are spaced apart from each other and wherein the distance between said spine first and second engagement portions is greater when said binder is in an open position than when said binder is in a closed position.

21. A storage case for multiple compact discs as claimed in claim 14, further including a plurality of disc carrier positioning members disposed in spaced-apart order on said spine center portion, said disc carriers further including a plurality of openings that receive said disc carrier positioning members therein.

22. A storage case for housing multiple compact discs held on individual disc carriers and for displaying said disc carriers in a radial fashion when the storage case is opened, said storage case comprising: first and second cover portions that cooperatively define a hollow enclosure for enclosing said multiple compact discs when the first and second cover portions are closed together, said first and second cover portions being hinged together along a designated hinge line disposed along an end of said storage case such that said first and second cover portions are openable and closeable about said hinge line, said storage case further including a flexible internal spine portion disposed within said hollow enclosure and extending between said first and second cover portions in a manner to span said hinge line, said internal spine portion including a plurality of engagement members disposed thereon that receive said disc carriers, said engagement members being disposed on said internal spine portion in a pattern such that when said storage case is opened and said first and second cover portions are moved apart from each other around said hinge line, said engagement members are displayed from said spine in a radial fashion around said hinge line.

23. The storage case as recited in claim 22, further including a plurality of disc carriers having means for engaging said engagement members.

* * * * *